Nov. 20, 1973  L. BRONSTEIN  3,773,868
METHOD FOR MAKING CONTACT LENS BLANKS
Filed June 22, 1972  2 Sheets-Sheet 1

Nov. 20, 1973  L. BRONSTEIN  3,773,868

METHOD FOR MAKING CONTACT LENS BLANKS

Filed June 22, 1972  2 Sheets-Sheet 2

United States Patent Office 3,773,868
Patented Nov. 20, 1973

3,773,868
METHOD FOR MAKING CONTACT LENS BLANKS
Leonard Bronstein, Scottsdale, Ariz., assignor to
Poly Optics, Inc.
Filed June 22, 1972, Ser. No. 265,276
Int. Cl. B29d 11/00
U.S. Cl. 264—1                                              4 Claims

ABSTRACT OF THE DISCLOSURE

A method for making contact lens blanks comprising the fixing of optical lens material to an accurate shaft having a concentric axis of rotation and placing the shaft in a rotary machine and machining an optical interface configuration on the optical material fixed to the shaft so that the interface configuration is concentric with the axis of the shaft, then placing the shaft and the optical material fixed thereto in a mold and then placing hardenable material on said optical configuration in said mold and allowing the hardenable material to harden and become fixed to the interface configuration; removing the shaft from the mold and machining the materials thus fixed to the shaft into a lens blank by machining the periphery of the lens blank concentric with said axis of said shaft and by machining opposite ends of said lens blank normal to said axis; the method also relating to the machining of a second interface configuration on the first mentioned hardenable material and subsequently casting or placing a second hardenable material over the second interface configuration in accordance with the aforementioned molding method, then machining all three optical materials into a lens blank with the periphery and opposite ends of the blank accurate in relation to the axis of the shaft such that the periphery of the blank is concentric with the axis of the shaft and opposite ends of the blank are normal to the axis of the shaft.

BACKGROUND OF THE INVENTION

Heretofore, lens blanks have been produced by the contact lens industry and it has been desirable to produce lens blanks in which the optical interface configuration is concentric with the periphery of the blank and that an axis extending centrally through the periphery of the blank is normal to opposite ends of the blank so that the blank may be accurately disposed and located in machines so as to accurately machine the corneal contact side of the lens as well as the anterior side in concentric relation to the interface configuration of the lens blank as originally produced. The aforegoing requirements always relate to a matter of degree and in accordance with prior art practices, a great percentage of lens blanks do not meet the standards of accuracy and are therefore unacceptable to the trade. Accordingly, there has been a substantial percentage of contact lens blanks produced in accordance with prior art practices which have been inaccurate as to concentricity and normality to the central axis, and therefore this substantial percentage of lens blanks so produced have represented a loss due to the rejection thereof. Additionally, the prior art practices of manually locating the initial blank piece with an interface configuration thereon, and a subsequent layer of optical material secured thereto, relative to a final machining operation, has been very difficult with respect to concentricity and normality of the final lens blank configuration relative to a common central axis which is concentric to the interface configuration of the lens blank.

SUMMARY OF THE INVENTION

The present invention relates to a method for producing contact lens blanks wherein all of the elements of a contact lens blank are held fixed to an accurate circular in cross section shaft having an axis of rotation about which the shaft and the blank parts are constantly held and machined including the interface configuration as well as the periperies and opposite ends of the lens blank during the entire machining, casting and final shaping of the blank such that the central axis, concentric with the interface configuration, is also an exact center of the periphery of the finished blank and is normal to opposite ends of the finished blank so as to provide accurate holding reference surfaces for the accurate machining of corneal contact and frontal surface areas of a finished contact lens such that these last mentioned surfaces may also be concentric with the interface configuration of the blank and that opposite ends of the blank may be normal to the central axis of the interface configuration.

The invention comprises novel steps of fixing a first blank piece of material to an accurate, circular in cross section shaft having a central axis of rotation whereupon the shaft is placed in a rotary machine and an interface configuration is machined on the piece of material at a side thereof opposite to that fixed to the shaft; the interface configuration is subsequently polished while the shaft is rotated in the machine, and then the shaft and the piece having the interface configuration thereon is placed in a mold with the shaft extending through an opening in the mold and hardenable optical material is placed in the mold over the interface configuration and allowed to harden thereon whereupon the shaft carrying the first piece and the hardened material is removed from the mold and the shaft is again placed in a rotary machine and the first piece of material and the hardened material may then be machined accurately into a contact lens blank by machining the periphery of the blank concentric with the axis of the shaft and opposite ends of the blank normal to the axis of the shaft. Additionally, the method comprises the production of a multi-layered lens blank in a similar manner wherein at least three layers of optical material are so formed in a blank by alternate machining and casting of maetrial on interface configurations and the lens blank is finally machined as hereinbefore described with its periphery and all of the layers thereof concentric to the axis of the shaft and wherein all of the interface configurations are concentric to the axis of the shaft at opposite ends of the lens blank are normal to the axis of the shaft. The lens blank finally may be separated from the shaft by machining one side of the lens blank adjacent to the shaft inwardly to the axis of the shaft and thus accurately separating and machining one side of the lens from the shaft.

Accordingly, it is an object of the invention to provide a novel method for producing contact lens blanks which is conducive to economic production of very accurate lens blanks having opposite ends and peripheries all properly disposed with relation to an interface configuration of the lens blank such that the periphery of the blank is concentric with the interface configuration and wherein opposite ends of the blank are normal to a central or concentric axis of the interface configuration.

Another object of the invention is to provide a method which produces contact lens blanks of very fine accuracy and which, due to the accuracy of such lenses produced by the method, reduces the overall cost of such lenses due to the fact that the rejection percentage of lenses so produced is very nominal.

Further objects and advantages of the invention may be apparent from the following specification, appended claims, and accompanying drawings.

DESCRIPTION OF THE PREFERRED EMBODIMENTS

Figure 1:
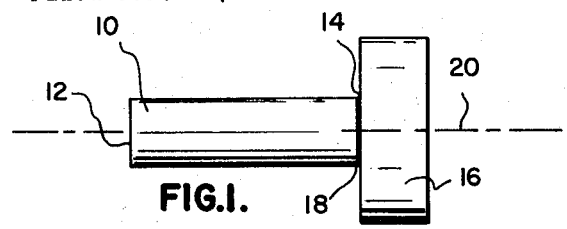
FIG. 1 is a side elevational view of a circular in cross section shaft having a blank piece of the optical material secured thereto and representing a step of the method of the invention.
Figure 2:
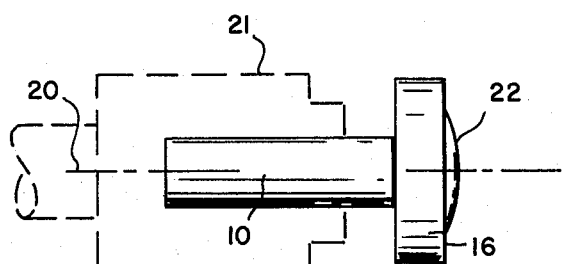
FIG. 2 is a view of the shaft and blank piece shown in FIG. 1 being rotated in a rotary machine and having an interface configuration machined on an end of the blank piece opposite to that connected to the shaft.
Figure 3:
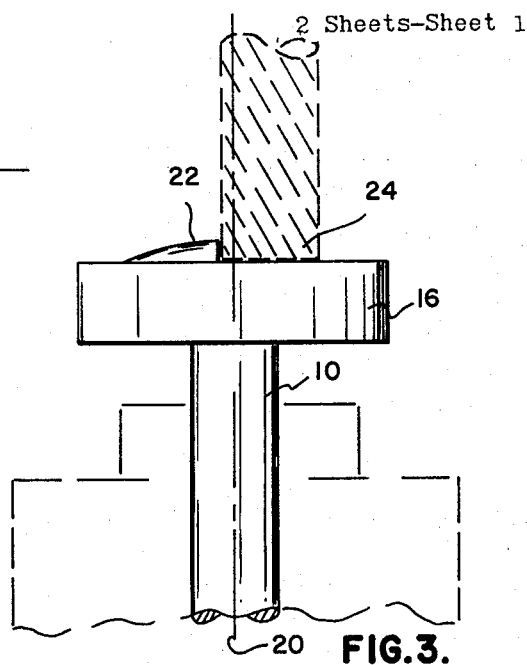
FIG. 3 is an enlarged view similar to FIG. 2 but showing a further step involving the machining of an interface configuration on the blank piece secured to the shaft as shown in FIG. 1 and wherein the shaft is supported in precise relation to elements of the machine forming the interface configuration.
Figure 4:
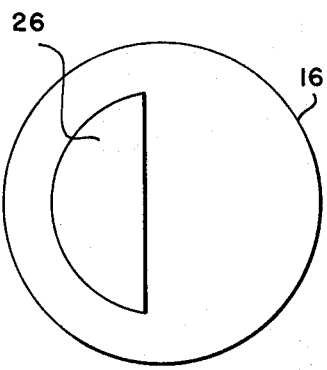
FIG. 4 is a view taken from the line 4—4 of FIG. 3 showing an example of the specific interface configuration produced in accordance with the method step shown in FIG. 3.
Figure 5:
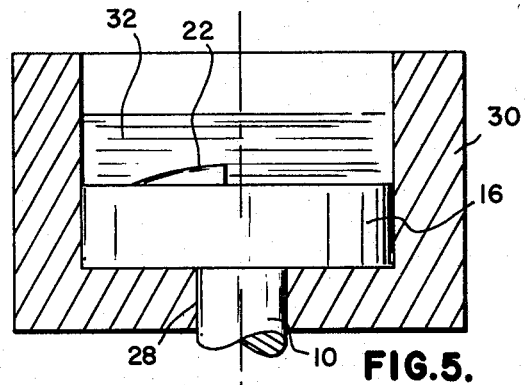
FIG. 5 is a sectional view showing the shaft at interface configuration of FIG. 3 disposed in a mold and the casting of a layer of optical material on the interface configuration.

As shown in FIG. 1 of the drawings, a circular in cross section shaft 10 is provided with opposite ends 12 and 14, a blank piece of optical material 16 is preferably cast onto shaft 10 while the shaft 10 is in a mold or adhesively fixed at 18 to the end of the shaft 10 by any one of the usual materials such as conventional pitch adhesives or other suitable adhesives which may be used for such purposes. Accordingly, the blank piece of optical material 16 is fixed to the shaft 10 which has a central axis of rotation 20. The shaft 10 is then placed in the chuck 21 or collet 21 of a rotary machine and is rotated about the axis 20 and an interface configuration 22 is machined in the conventional manner on a surface of the blank piece 16 opposite to the side fixed at 18 to the shaft 10. This interface configuration 22, being spheroid, is concentric to the axis 20. This interface 22 may then be polished while the shaft 10 is still held in the chuck 21. The next step in forming the complete interface configuration may occur by applying a machine cutter 24 to the interface configuration 22 and forming, as for example, a bifocal projection 26 as shown in FIG. 4 of the drawings, however, this interface configuration may be varied in accordance with requirements of the blank ultimately to be formed into a contact lens. It will be seen that the tool 24 may machine portions of the interface configuration normal to the axis 20 of the shaft 10, whereupon the interface configuration is disposed in a mold as shown in FIG. 5 with the blank piece 16 therein and with the shaft 10 snugly held in an opening 28 in the bottom of the mold 30. This mold may then be partially filled with a layer of liquid or other optical material designated 32 which is a hardenable material commonly known in the optical industry and which becomes bonded to the interface configuration 22 when the material hardens. The shaft 10 together with the blank piece 16 and the hardened material 32 may then be removed from the mold and shaft 10 may be placed in the chuck 21 of a rotary machine and rotated about the central axis 20. The blank piece of material 16 together with the hardened hardenable material 32 may then be machined into a contact lens blank with the peripheral portion 34 of the blank concentric with the axis 20 and with opposite ends 36 and 38 of the blank normal to or at right angles to the axis 20 of the shaft 10. The blank thus formed may either be left in secure position on the shaft 10 or may be separated therefrom by machining the side 38 to a broken line position 40 such that the side 38 is machine inward to the axis of the shaft 20 and thereby parting the entire lens blank from the lens shaft 10 if desired. It will be understood however that it may be desirable to retain the lens blank on the shaft 10 until the anterior portion of the blank is machined for contact lens production purposes.

Figure 6:
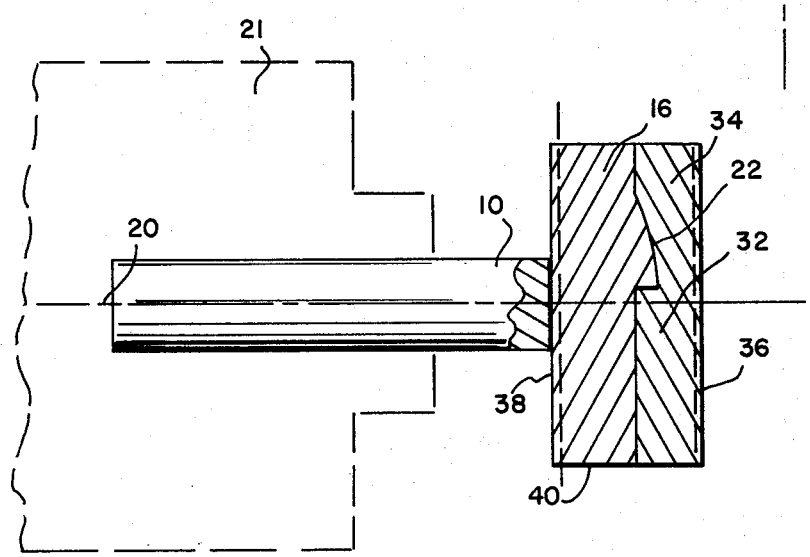
FIG. 6 is a view of a further method step showing the shaft carrying the blank piece and the cast on layer of FIG. 5 where the shaft is held in a rotary machine and the peripheral portions of a lens blank are machined concentric to the axis of the shaft and opposite ends of the lens blank are machined normal to the axis of the shaft.
Figure 7:
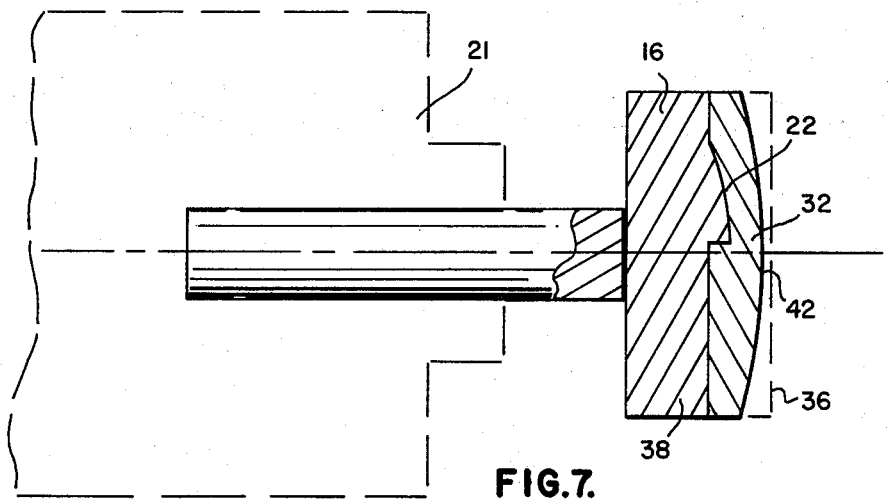
FIG. 7 is a view similar to FIG. 6 but showing a further method step wherein a second interface configuration is formed and machined concentric to the axis of the shaft and machined on the cast on layer which is disclosed as being cast on FIG. 5.
Figure 8:
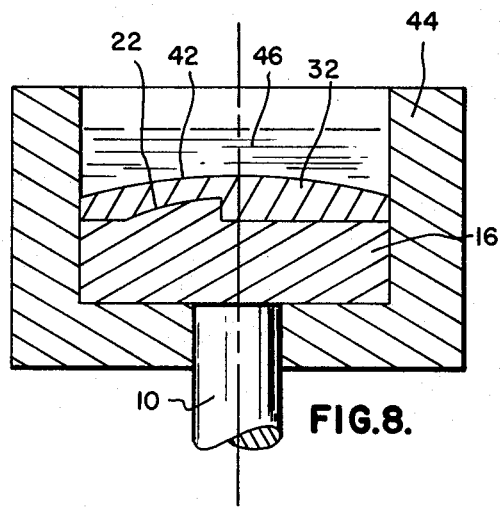
FIG. 8 is a view similar to FIG. 5 but showing the structure of FIG. 7 placed in a mold and casting a second hardenable layer of optical material over the second interface configuration produced as shown in FIG. 7.
Figure 9:
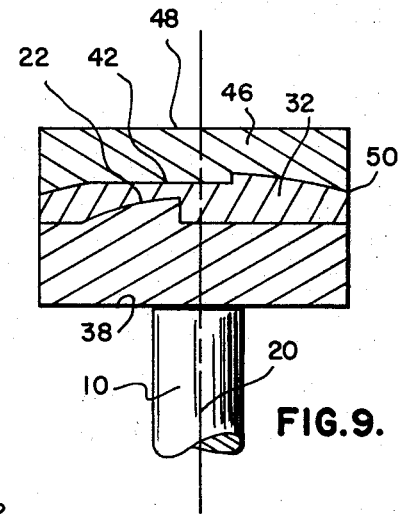
FIG. 9 is a view similar to FIG. 6 showing the lens blank as formed in FIG. 8 machined with its periphery concentric to the axis of the shaft and its opposite ends machined normal to the axis of the shaft.

As shown in FIG. 7, the structure as illustrated in FIG. 6 when retained on the shaft 10 may be rotated by the machine tool chuck 21 and a second interface configuration 42 may be machined on the layer 32, whereupon the structure as shown in FIG. 7 may be placed in a second mold 44 and a second layer of hardenable material 46 may be cast onto the second interface configuration 42. The shaft 10 together with the piece of material 16 and the first and second layers of hardenable material 32 and 46 may be removed from the mold 44 and machined in a manner as disclosed in FIG. 6 of the drawings wherein opposite ends 38 and 48 of the blank shown in FIG. 9 may be normal to the axis 20 of the shaft 10 and wherein a periphery 50 of the lens blank may be concentric with the axis 10.

It will be obvious to those skilled in the art that the concentricity of all of the interface layers and the periphery of the blank is very important and that the normality of the opposite ends of the blank relative to a central or cencentric axis of the interface layers is very important so that the blank may be accurately set up in machines for the proper machining of corneal contact surfaces as well as the anterior surfaces of contact lenses in concentric relation with the related interface configurations of such lenses.

It will be obvious that a single piece of optical material may be formed into a lens blank in connection with the shaft 10.

Figure 10:
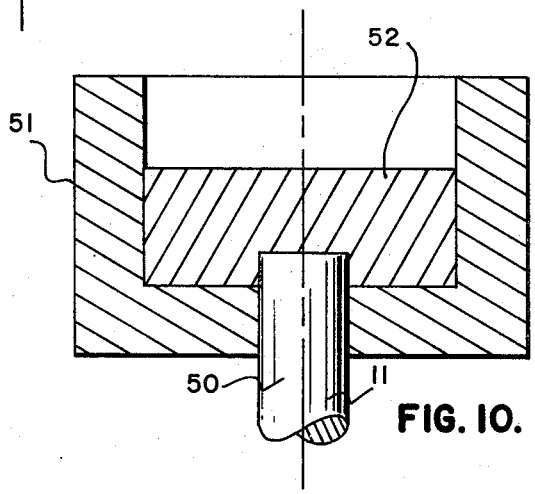
FIG. 10 is a sectional view showing a preferred method of securing an optical lens blank piece to a supporting shaft.

As shown in FIG. 10, the shaft 50 is similar to the hereinbefore described shaft 10. The shaft 50 is first inserted into a mold 51 and a first blank 52 of optical material is cast onto the shaft 50 for securing the blank to the shaft.

The blank may then be machined as hereinbefore described, thus the blank may be initially fixed to the shaft and this method may be preferred.

It will be obvious to those skilled in the art that various modifications may be resorted to without departing from the spirit of the invention.

I claim:

1. A method for producing contact lens blanks comprising the preparation of an accurate circular in cross section shaft having a central axis of rotation; fixing a first blank piece of optical material on said shaft; placing said shaft in a rotary machine and rotating said shaft about said axis; machining a first optical interface configuration concentric with said shaft and on an end of said first blank piece opposite to an end thereof which is fixed to said shaft; polishing said first optical interface configuration while rotating said shaft about its axis; preparing a mold having a cavity adapted to receive said first blank piece; preparing a bottom in said mold with a central opening adapted to snugly receive said shaft;

placing said shaft and said first blank piece in said mold with said shaft disposed in said central opening; placing hardenable optical material in said mold over and on said optical interface configuration; allowing said hardenable optical material to harden and to become fixed to said optical interface configuration; removing said shaft and said first blank piece together with said hardened hardenable material from said mold; placing said shaft in a rotary machine and rotating said shaft about said axis thereof, and machining said piece of material and said hardened material into a generally disc shaped lens blank by machining the periphery of said lens blank concentric with said axis and by machining opposite ends of said lens blank normal to said axis.

2. The invention as defined in claim 1, wherein: said lens blank is finally separated from said shaft by machining one end of said blank to the axis of said shaft.

3. A method for producing contact lens blanks comprising the preparation of an accurate circular in cross-section shaft having a central axis of rotation; fixing a first blank piece of optical material on said shaft; placing said shaft in a rotary machine and rotating said shaft about said axis; machining a first optical interface configuration concentric with said axis and on an end of said first blank piece opposite to an end thereof which is fixed to said shaft; polishing said first optical interface configuration while rotating said shaft about its axis; preparing a mold having a cavity adapted to receive said first blank piece and preparing a bottom in said mold with a central opening adapted snugly to receive said shaft; placing said shaft and said first blank piece in said mold with said shaft disposed in said central opening; placing a hardenable optical material in said mold over and on said optical interface configuration; allowing said hardenable optical material to harden and to become fixed to said optical interface configuration; removing said shaft and said first blank piece together with said hardened, hardenable material from said mold; placing said shaft in a rotary machine and rotating said shaft about said axis and machining a second optical interface configuration concentric with said axis and on said hardened material opposite to said first mentioned interface configuration; polishing said second optical interface configuration while rotating said shaft about its axis; placing said shaft and said first blank piece of material together with said hardened material in said mold with said shaft disposed in said central opening; placing a second layer of hardenable optical material in said mold over and on said second optical interface configuration; allowing said second mentioned hardenable material to harden and to become fixed to said second optical interface configuration; removing said shaft and said first blank piece together with said first and second mentioned hardenable materials from said mold; placing said shaft in a rotary machine and rotating said shaft about said axis and machining the peripheries of said first blank piece of material together with said first and second hardenable materials concentric with the axis of said shaft and thereby machining all of said optical material coupled to said shaft into a disc shaped lens blank by machining the periphery of said lens blank concentric with said axis and by machining opposite ends of said lens blank normal to said axis.

4. The invention as defined in claim 3, wherein: said lens blank is separated from said shaft by machining an end of said lens blank adjacent said shaft to the axis thereof.

References Cited
UNITED STATES PATENTS

| | | | |
|---|---|---|---|
| 3,460,928 | 8/1969 | Casko | 264—1 X |
| 3,560,598 | 2/1971 | Neefe | 264—1 |
| 3,684,357 | 8/1972 | Tsuetaki | 264—1 X |
| 3,697,629 | 10/1972 | Bronstein | 264—1 |
| 3,662,040 | 5/1972 | Urbach et al. | 264—1 |

ROBERT F. WHITE, Primary Examiner

A. M. SOKAL, Assistant Examiner

U.S. Cl. X.R.

264—162, 255; 51—284; 351—161